United States Patent [19]

Irwin

[11] 3,729,713

[45] Apr. 24, 1973

[54] DATA PROCESSING PERIPHERAL SUBSYSTEMS

[75] Inventor: John W. Irwin, Longmont, Colo.

[73] Assignee: International Business Machines Corporation, Armonk, N.Y.

[22] Filed: Aug. 4, 1971

[21] Appl. No.: 168,937

[52] U.S. Cl. .......... 340/172.5

[51] Int. Cl. .......... G06f 11/06, G06f 11/12

[58] Field of Search .......... 235/153; 346/74; 340/172.5

[56] References Cited

UNITED STATES PATENTS

| | | | |
|---|---|---|---|
| 3,582,903 | 6/1971 | Verdier | 340/172.5 |
| 3,599,156 | 8/1971 | Miller et al. | 340/172.5 |
| 3,099,818 | 7/1963 | Murray | 340/172.5 |
| 3,579,195 | 5/1971 | Hallmark et al. | 340/172.5 |
| 3,550,133 | 12/1970 | King et al. | 340/172.5 |
| 3,576,433 | 4/1971 | Lee, III et al. | 235/153 |
| 3,626,206 | 12/1971 | Stebbins | 235/153 |

*Primary Examiner*—Gareth D. Shaw
*Attorney*—J. Jancin, Jr. et al.

[57] ABSTRACT

Improved peripheral I/O devices, such as magnetic tape units and I/O controllers, are provided by selectively gating operational state indicating signals over multiplexed lines to an I/O controlling unit for continuously indicating intermediate operational states. The I/O controller, which may be a microprogrammed controller, responds to the intermediate state indications for monitoring and ensuring the intermediate operational states are properly maintained. Upon termination of the intermediate operational state, the next status of the I/O device is sensed. Supplying intermediate operational state conditions enables the I/O controller to sense when malfunctions have occurred which prevent the device from informing the I/O controller that such malfunctions have, in fact, occurred.

24 Claims, 3 Drawing Figures

DATA PROCESSING PERIPHERAL SUBSYSTEMS

DOCUMENTS INCORPORATED BY REFERENCE

1. U. S. Pat. No. 3,336,582 (CPU channel commands to control unit).
2. U. S. Pat. No. 3,372,378 (a switching system for a data processing system).
3. U. S. Pat. No. 3,400,371 (a CPU).
4. U. S. Pat. No. 3,550,133 (a channel).

BACKGROUND OF THE INVENTION

This invention relates to control and sensing status of peripheral subsystems usable with data processing systems.

Peripheral subsystems usually consist of one or more I/O controllers or control units (CU's), each of which controls and supervises a plurality of I/O devices such as magnetic tape units, printers, and the like. The units are interconnected by cables having a limited number of wires. This limitation effects standardization, reduces cost, and improves reliability. This is particularly important when multiplexing switching systems are interposed between a plurality of CU's with a larger plurality of I/O devices. Further, because of industry standardization of connector sizes, such as 16, 24, 45, etc., connections per connector, the addition of a line to a cable may require moving from a 24-pin connector, for example, to a 45-pin connector, and the like. The resultant increased bulk, not only of the cable, but also of the connectors, and increased cost may not be warranted by the required additional function. Accordingly, multiplexing of functions on lines is a desired approach to solving the "cable" problem.

In some data processing environments, particularly those environments having a plurality of independently programmed central processing units (CPU's), the status of various I/O devices must be maintained and be sensible by any program within any of the CPU's. This action prevents delays by inaccurate or incomplete status reporting of the peripheral subsystem(s). Many multicomputer subsystems have loosely coupled processors. That is, limited communication is provided between the various CPU's limiting the status exchange therebetween. This is also true when it comes to shared peripheral subsystems. In spite of limited communications, all current status should be reportable.

Many peripheral subsystems have an interruption line extending from each device to each and every connected controller. The interruption line carries signals from the device to the controllers requesting the controller to give attention to the I/O device. The signal code permutations on bus in (BI) lines extending from the device to the controller via a multiplexing switch indicate the reason(s) for activating the interruption line. The interruption line, at different times and at different operating conditions of the peripheral subsystem, is interpreted to mean different things by the I/O controller.

Additionally, the I/O device has a busy/not busy line. That is, when busy is activated, the I/O device is performing a function or is switched to some other CU and is not available to perform additional functions. In some peripheral subsystems, such as magnetic tape subsystems, the tape driving capstan in a magnetic tape unit (MTU) includes a tachometer system producing square tachometer signals. These tachometer signals indicate tape transport within the MTU. The tachometer signals are selectively supplied over the busy/not busy line to CU. CU analyzes the tachometer pulses for determining the quality of tape transport. During certain operations, such as rewind, the tachometer pulses may be inhibited with the busy line being activated to a steady-0state condition.

For reliability purposes, device-I/O controller interfaces have signal states limited to two conditions. This is a so-called digital interface. CU controls the interface. The I/O device responds to selected tag or control signals supplied by CU to perform functions and to return acknowledgement or conform signals through the interface. However, the confirm signals cannot indicate subsequent changes in operating conditions of I/O device. For example, manual intervention of an I/O device may cause it to change operational states. This may or may not be detectable by CU. As a result, certain data processing operations in a CPU may be delayed because of such manual intervention. If the I/O controller could sense such intervention, then data processing could proceed knowing of the changed operational status of the peripheral device.

SUMMARY OF THE INVENTION

It is an object of the present invention to provide simplified indications for no changes during intermediate operational states of a peripheral device connected to a controlling unit. Various intermediate operational states can be indicated.

In accordance with the present invention, an intermediate operational state is indicated by modulating a normally steady-state signal condition. Termination of the modulation indicates a change in state. The changed state or status is indicated by a steady-state signal on the modulated line or another control line used in conjunction with the modulated line. Substitution of a steady-state line for a modulated line for indicating intermediate operational status changes is within the scope of the invention.

The invention is illustrated by defining various intermediate operational states for a tape subsystem and describing how the invention is applied to such intermediate operational states.

The initial status of READY for an MTU is indicated without committing (exclusively connecting) an MTU to a CU. A typical sequence of operations is that CU will attempt to select MTU. Upon receiving a NOT READY indication, a MODE SET command is sent initiating pulsing operations. A CPU issues a MOUNT TAPE REEL message to the operator. MTU continues pulsing the line until the MTU is READY, at which time pulsing stops. CU now knows there has been a change in status and proceeds with a SENSE command to MTU for determining MTU's changed operational state. Pulsing can also be stopped by a LOAD CHECK which indicates the tape from the reel was not properly threaded in MTU or by a power loss in a device. Pulsing is also stopped by MTU automatically when it reaches a READY state.

The above aspect of the invention is important wherein a plurality of CU's operates with the same plurality of MTU's. The pulsing line is interpreted by a second selected CU that the MTU is in an intermediate operating state. That second CU then can check its own memory to determine the relationship of such intermediate operational state to commands it has received.

The invention also has application as a security feature. After the above-described process, the pulsing line is additionally usable for indicating no change or manual intervention of an MTU after tape mounting. Generally, a CPU will verify that the tape loaded on an MTU is the one commanded to be mounted. Usually, tapes will have a label near BOT (beginning of tape). This label is read by CPU sending READ commands to CU. Upon verification that the proper tape has been mounted, CPU commands CU to secure MTU. CU sets a security flag in its memory and commands MTU to pulse the interruption line. MTU maintains pulsing until there is a change in operational status such as manual intervention, an operating command is received from CU, and the like. Upon succession of pulsing, CU interrogates the status of MTU to determine whether the change in operational status was by manual intervention, a mechanical error, or a NOT READY to READY change in status. Changes in status resulting from CU commands to MTU are normal operating changes.

During certain operating states, certain lines extending from the device to the controller are inhibited. For example, in a magnetic tape subsystem, during a write operation, the bus in (BI) lines normally carrying the readback signal from MTU to CU are degated at CU. This ensures that any noise signals detected while the read gap is in an IBG (interblock gap) will be detected and erased so that they will not be later transmitted to a data processing system as erroneous data.

The above listed applications of the present invention do not interfere nor degrade the steady-state signal indication of an interruption or attention signal. As will become apparent, the present invention can be practiced such that the interruption signal overrides or replaces the signal indicating the intermediate operational state. Also, power loss, disconnection (physical), or interference by another controlling unit stops the intermediate operational state indicating signal. The latter affords detection of changes by a CU important in the initial phases of a subsystem data processing operation which not only includes selection, but loading or otherwise initializing a peripheral device. Such detection prevents enhancing total system operation in that data processing associated with a given peripheral device need not be frustrated by device failure. In accordance with one aspect of the invention, one intermediate operating state, i.e., traversal of an IBG by a read gap during a write operation before detection of the recorded signals, is indicated by modulating a control line extending from the device to the I/O controller until the device determines that motion has proceeded to the beginning of the write area and signals GAP COMPLETE. The I/O controller, by sensing the modulated signal, is not dependent upon BI to transmit the GAP COMPLETE signal. The CU can therefore specify that BI contains read data and knows that any signals coming in from the device have to be noise and can log error conditions accordingly.

In certain types of peripheral subsystems, a particular and precise format of data signals on a magnetic media is required. In many instances, the location of gaps of a transducer to signals recorded on the tape and IBG's may be critical. Since the tachometer signals are supplied by the device to the I/O controller, the amount of relative movement between the medium and the transducer can be metered. However, the direction of movement must be indicated. In another aspect of the present invention, when a move of the media is commanded in a first direction and because of current operating conditions in the device, upon receipt of the commanded move, the media is moved in an opposite direction initially. Such a move is an intermediate operational state indicated by a modulated signal supplied to CU. The media travel is then reversed; with movement started in the commanded direction, the modulated signal is removed. The I/O controlling unit can respond to the modulated signal for counting tachometer pulses in the opposite direction and then subtracting same from the count in the commanded direction for obtaining a true measure of the actual distance of relative motion between the media and the transducer as a result of a commanded move.

The foregoing and other objects, features, and advantages of the invention will be apparent from the following more particular description of preferred embodiments of the invention, as illustrated in the accompanying drawing.

THE DRAWING

DETAILED DESCRIPTION

Figure 1:
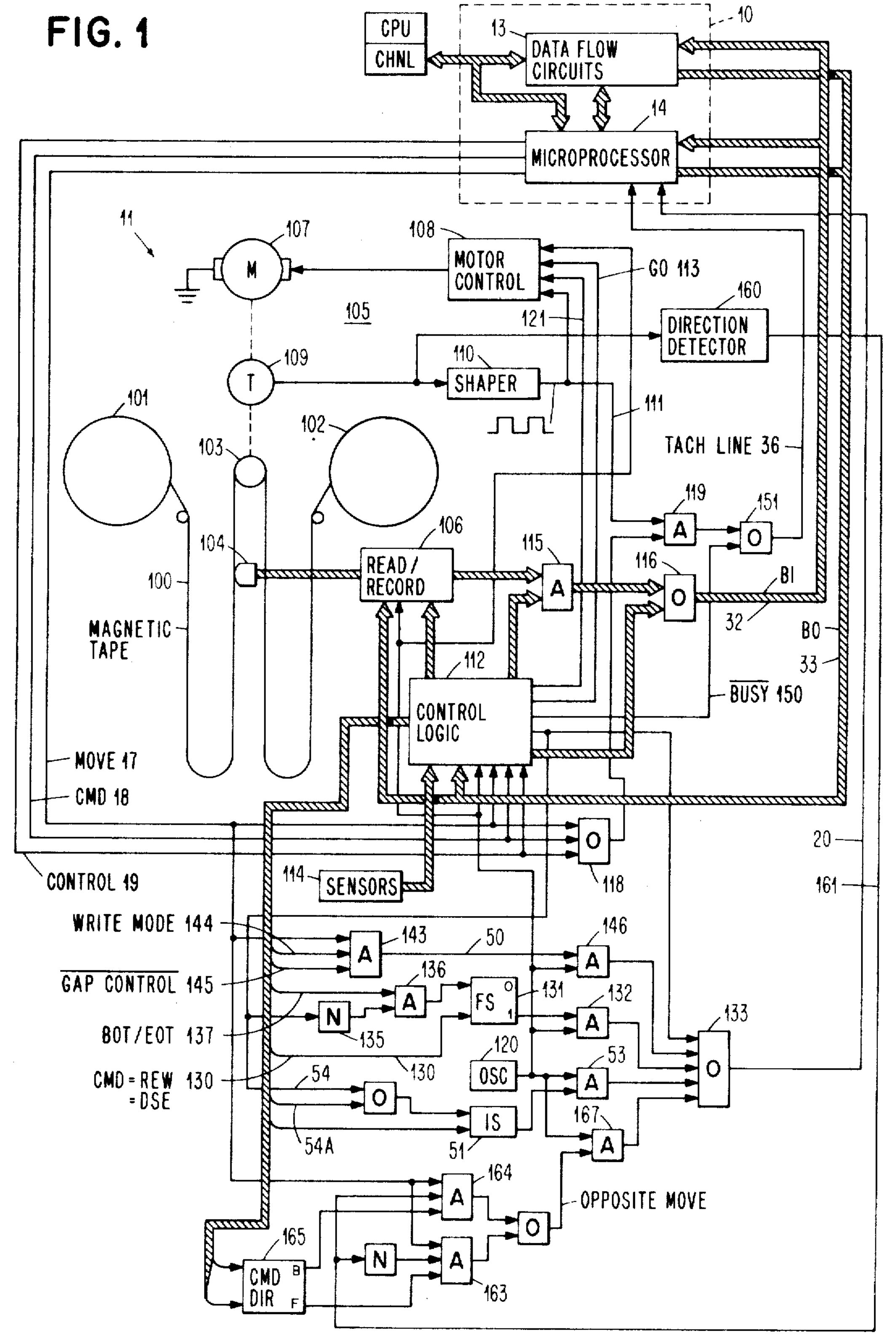
FIG. 1 is a simplified logic block diagram of a single magnetic tape unit with a single I/O controller connected to a CPU which incorporates the teachings of the present invention.

Referring now more particularly to the drawing, like numerals indicate like parts and structural features in the various diagrams. CPU is connected to I/O controller or CU 10 via a channel (CHNL). The channel can be an IBM System 360 or 370 channel using the known data exchanging techniques. CU 10 may be connected to one or more magnetic tape devices (MTU's), one of which is indicated generally by numeral 11. CU 10 has data flow circuits 13 controlled and supervised by microprocessor 14, of known design. Several microprograms and microprocessors are described by Samir Husson in his book MICROPROGRAMMING PRINCIPLES AND PRACTICES, Prentice-Hall, New York, 1970, Library of Congress No. 72-122612. Data flow circuits 13 include skew buffers, NRZI signal generator circuits, PE or phase-encoded generator circuits, and corresponding detection circuits. Additionally, hardware error detection circuits are usually provided. Circuits 13 process signals exchanged with channel and MTU 11 over various cables. Microprocessor 14 controls data flow circuits 13 by code permutations in a set of registers (not shown). The code permutations in the registers are supplied to various circuits, such as the NRZI and PE circuits, for activating or deactivating same in accordance with channel commands (see referenced documents).

Microprocessor 14 includes a set of microprograms 15 (FIG. 3) for controlling exchange of signals with channel and MTU 11. The present invention concerns the interface, responsiveness, and exchanging status signals between CU 10 and any one or more of MTU's 11 and to the internal logic construction of MTU 11.

Data to be recorded and commands from CU 10 to MTU 11 are supplied over bus out (BO) lines 33. Commands go to control logic 112 while data goes to read/record circuits 106. In a similar manner, signals read from a magnetic media are supplied to CU 10 from MTU 11 via BI lines 32. Both BI and BO lines have nine circuits, eight for data signals (one byte) and one for parity signal. The BI and BO lines are both connected to the data flow circuits 13 and microprocessor 14. Circuits 13 supply and receive data signals while microprocessor 14 supplies and receives command and status signals in accordance with known techniques.

A set of three control lines extend from microprocessor 14 to each MTU 11. A first line 17, when activated, instructs MTU 11 to move the tape. A second line 18 informs MTU 11 that the signals being sent over BO 33 contain a command. Such commands can be "set PE mode," "move tape in the forward direction," "move tape in the reverse direction," "provide sense bytes from control logic 112," and the like. The third line 19 sets up a control mode in MTU 11 necessary for operations such as rewind, data security erase, and the like.

MTU 11 has two control lines extending to CU 10. The first line 20 is termed an "interruption" or "attention" line. When at a reference potential, "normal" is indicated. A second signal state is an interruption or attention signal. Line 36 is a tachometer/busy line. When a reference potential is supplied over line 36, the MTU signals CU 10 that it is not busy. A steady-state active signal state indicates that it is busy. Under certain operating conditions, tachometer signals (later described) are supplied over line 36 to enable CU 10 to monitor and analyze MTU 11 performance.

In MTU 11, magnetic tape 100 is selectively transported past transducer or head 104 between a pair of tape spools 101 and 102 by capstan 103. Tape 100 forms a pair of bights in low inertia vacuum bins (not shown) for improving the acceleration and deceleration characteristics. In many MTU's, such characteristics are very important for short access times and ensuring that magnetic tape 100 continually bears against head 104 for effecting desired transducing operations. By analyzing the tachometer signals on line 36 supplied by the motor drive system 105 in combination with the signal read through head 104 and then processed by read/record circuits 106 for I/O controller 10, MTU performance is analyzed and controlled.

The tape driving system includes capstan 103 on motor 107 plus motor control 108. A velocity set point is supplied to motor control 108. Such set point may be from oscillator 120 or an analog voltage. Motor 107 has tachometer 109 supplying signals to shaper 110 which then supplies a square wave over line 111 indicating performance of motor 107. Tachometer 109 is preferably of the digital type, that is, a disk or ring with a large plurality of light/dark areas for indicating rotational translation. A reflective tachometer may be used having alternate reflective and nonreflective areas. In any event, shaper 110 supplies a tachometer signal, preferably a square wave, over line 111 which is indicative of motor 107 performance as controlled by motor control 108.

Assuming no tape slip between tape 100 and capstan 103, tachometer signals on line 111 indicate translation of tape 100 past head 104. For selectively controlling movement of tape 100, control logic 112 is responsive to signals supplied by CU 10 over BO line 33 and move line 17 to supply a "go" signal over line 113 to motor control 108. As soon as the "go" signal is removed by control logic 112, control 108 actuates motor 107 to stop. The generation of the "go" signal on line 113, as well as direction (forward/backward) signals over line 121, in response to signals supplied by CU 10, is well known and is not further described for that reason.

Control logic 112 also actuates and controls read/record circuits 106 in accordance with known techniques; such control is not further described for that reason. Control logic 112 sequences the outputs of sensors 114 to BI 32 in response to command signals received from CU 10 to supply what are usually termed "sense bytes" which indicate MTU status. Such sensors may indicate the location of tape 100, whether or not a pair of tape spools 101 and 102 are mounted in the MTU for proper operation, and the like. Also, read/record circuits 106 may include gating and other logic circuits in accordance with known techniques. In controlling the signals read back from transducer 104, AND circuits 115 selectively gate the partially detected signals in read/record circuits 106 through OR circuit 116 to BI 32 for transfer to CU 10. CU 10 continues the processing of such signals in data flow circuits 13. The control of AND circuits 115 is in accordance with command signals received from CU 10.

While recording signals on tape 100, the data bytes to be recorded are supplied over BO 33 simultaneously with the move signal line 17. The data signals to be recorded are transferred directly to read/record circuits 106 for amplification and supply to transducer 104. CU 10 coordinates the MOVE command on line 17 together with the transfer of data bytes to be recorded over BO 33. Signals on the other two control lines cause control logic 112 to receive the signals on BO 33 and decode same for causing functions to be performed in MTU in accordance with the signal permutations on BO. Such control or command signals may cause MTU to rewind the tape, transfer sense bytes from sensors 114 to BI, set up operations for transferring the signals from BO to transducer 104 or vice versa, etc.

Transfer of tachometer signals from shaper 110 and line 111 to tach line 36 may be under control of CU 10. That is, any signals on tag lines 17–19 are supplied through OR circuit 118 enabling AND circuit 119 to pass the tachometer signals to tach line 36. That is, any time the addressed MTU is receiving a tag signal from CU 10, CU 10 is instructing MTU to transfer tachometer signals. In the alternative, line 111 may be connected directly to tach line 36 such that any time motor 107 is activated, tachometer signals are supplied over line 36. In that arrangement, which is preferred in some applications, CU 10 is programmed to receive such tachometer signals on a selective basis; i.e., program operated gates either inhibit or pass tachometer signals to appropriate circuits.

In the former arrangement, AND circuit 119 enables tach line 36 to be used for supplying tachometer signals during any MTU operations. When MTU is not busy, a not busy signal is generated by control logic 112 and supplied over not busy line 150 through OR circuit 151 to tach line 36. In the latter instance, CU 10 shares a particular MTU with another I/O controller. If a predetermined steady-state voltage appears thereon, the interrogating I/O controller knows MTU 11 is available and then can select same for data processing, diagnostic, or other operations. However, if tachometer signals are being supplied over line 36 by the addressed MTU, then the interrogating I/O controller knows MTU 11 is active; and it will then branch to other operations. This latter arrangement is useful in complex data processing systems wherein a plurality of I/O controllers is connected to a larger plurality of MTU's and also to a plurality of CPU's.

INITIAL INTERMEDIATE OPERATING STATE WITHOUT COMMITTMENT

An important application of the present invention is during the initializing portion of a data processing operation. Before any peripheral unit can be utilized in a data processing operation, a manual or automatic loading operation must be completed. In an MTU, a reel of tape must be manually or automatically loaded onto MTU, then automatically threaded, as is well known. In a printer application, format chains and paper must be loaded. Since such loading operations are long compared to electronic operations, plus few ways of detecting actual status during such periods, the invention has particular importance during this portion of data processing operations.

In many configurations, a given MTU is controlled by more than one CU. Each CU, in turn, can be connected to a plurality of CPU's. Any CPU can command any CU to select such given MTU. Such attempted selections, as well as the loading operations, can cause changes in state on BUSY line 36. According to the present invention, after a CPU has commanded a CU to select MTU 11 and a NOT READY condition is received, MTU is commanded to send pulses continuously over interruption line 20. This is accomplished by activating command line 18 and sending a PULSING MODE SET command over BO 33. Subsequently, CPU prints out a MOUNT TAPE REEL message to the operator or orders retrieval of a tape reel from an automatic library. CU disconnects from MTU; i.e., other CU's theoretically can select the MTU for data processing operations. However, pulsing line 20 with pulses such as 128 indicate MTU is in an intermediate operational state and should not be selected unless the selecting CU has set certain flags in its memory. As soon as the tape reel is mounted on MTU, pulsing stops. This action indicates a change from the intermediate operational state. CU then responds by sensing the changed operational state. If MTU is READY, CU requests activity by CPU for the subsequent data processing operation. Also, manual intervention or failure in the automatic threading at MTU stops pulsing of MTU. In the latter instances, a UNIT CHECK signal is sent to CPU.

In MTU 11, control logic 112 responds to PULSING MODE SET signal to set IS latch 51 (IS = initial status). A signal over line 52 sets latch 51 , enabling AND circuit 53 to pass oscillator 120 square wave or pulses. These pulses reach interruption line 20 through OR circuits 133.

Control logic 112 responds to sensors 114 to sense that tape 100 has been properly loaded and threaded to establish a READY condition in MTU 11. At this time, control logic 112 supplies a latch resetting signal over line 54 disabling AND circuit 53 while at the same time forcing interruption line 20 to an active condition. This action enables control logic 112 to override the pulsing with an interrupt. Also, a signal on line 54A can reset IS latch 51 in response to a command received over BO 33. Sensors 114 may also indicate improper threading, improper loading, a mechanical malfunction, or the like. Control logic 112 is further responsive to such sensed conditions to reset IS latch 51.

During this period of time, the signals on line 36, due to the automatic loading operation, attempted selection by other CU's (not shown) which can cause MTU 11 to indicate it is BUSY. Since MTU is not committed, programming flexibility in CPU is enhanced by enabling intervention by another CU or manually. Such an arrangement also enhances flexibility of multiple access path peripheral subsystems.

SECURITY ALARM

After the above-described loading operation has been completed, CPU commands CU 10 to read the first two record blocks on tape 100. These are tape labels identifying the tape. Upon completion of the verification operation, that is, the tape label has been compared by CPU with the requested tape label, CPU commands CU 10 to protect the tape. CU 10 responds by issuing the above-described PULSING MODE SET. Simultaneously, a security flag is set by microprocessor 14 in its memory. Any change in the intermediate operational state of MTU 11 stops the pulsing and indicates to CU 10 via the security flag that an alarm should be sounded. CU 10 then interrupts CPU for indicating the status change. Such status change may be caused by manual ready drop (possibly unauthorized removal of a tape reel), a mechanical malfunction, or a NOT READY to READY interrupt. The latter indicates tape reels may have been changed.

CPU then issues an SIO or TIO to CU 10 in connection with a desired data processing operation. At this time, CU resets the security flag and issues a command (read, write, etc.) to MTU 11. Control logic 112 resets IS latch 51 and, hence, removes the pulsing condition from line 20. The usual data processing operation then ensues.

Additionally, AND circuit 53 may be disabled by MOVE line 17 being activated. This enables CU 10 to maintain close control over the condition of line 20 and permits moving tape 100 while maintaining the intermediate operating condition indication.

VERIFYING REWIND AND OTHER OPERATIONS

MTU 11 performs what is termed "free-standing" operations. For example, after CU 10 sends a REWIND command over BO 33 (timed with CMD line active), control logic 112 independently effects the rewind function. CU 10 disconnects from MTU 11. It is during such operations that one aspect of the invention applies, as will be next explained.

During a free-standing rewind by MTU 11, in accordance with the present invention, CU 10 receives a continuous signal indicating that a rewind is taking place. That is, there have been no changes in operational states of MTU 11. Upon completion of the rewind, by detecting BOT (beginning of tape), as is well known, MTU 11 discontinues sending the signal. At this time, control logic 112 supplies a not busy signal over line 36 and no interrupt status signal over line 20. It should also be noted that as soon as the free-standing operation is initiated, CU 10 can remove the CMD (command) line signal thereby disabling AND circuit 119 such that no tachometer signals are supplied over line 36.

Figure 2:
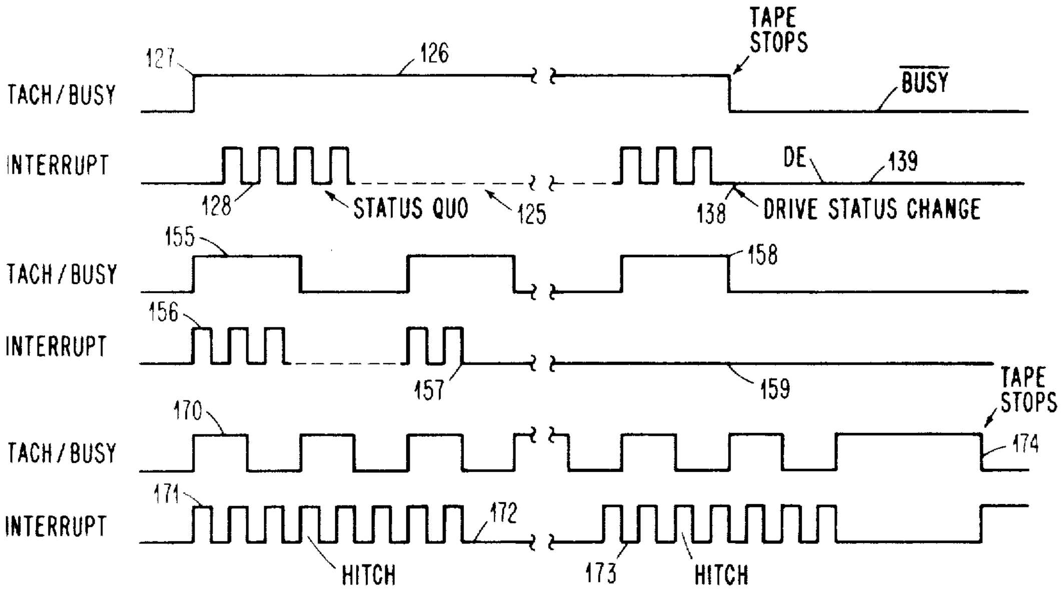
FIG. 2 is a set of simplified and idealized signal waveforms illustrating the operation of the FIG. 1 illustrated system when using the present invention.

Referring momentarily to FIG. 2, signal 125 represents the signal state of interruption line 20; while signal 126 represents the tachometer busy line signal state. Pulsing starts at 127 wherein the busy signal is activated as a positive portion of signal 126. At 128, oscillator 120 square waves are being sent over the interruption line 20. At this time, CU 10 had just removed the CMD signal from line 18 (FIG. 1); and control logic 112 had responded by sending an initiating signal over line 130 setting FS (freestanding) latch 131 to the active condition. AND circuit 132 is enabled and passes the oscillator 120 square wave to OR circuit 133, thence, interruption line 20. The square wave is continuously sent over line 20 until control logic 112 detects BOT on tape 100. At this time, control logic 112 drops the go-on line 113 to its inactive state for stopping motor 107. Go-on line 113 is also connected through logic inverting circuit 135 to AND circuit 136. AND circuit 136 is jointly responsive to GO returning to reference potential and to BOT/EOT (EOT = end of tape) signal supplied by control logic 112 over line 137 to reset FS latch 131. This action disables AND circuit 132 and stops the square waves at 138. At the same time, control logic 112 having sensed BOT knows rewind is complete. It then sends no attention signal over line 20 which is interpreted by CU 10 as a device end (DE); i.e., the interruption line 20 is negative as at 139. If an error occurs during the rewind, control logic 112 raises the interrupt line to a positive level. Also simultaneously, the busy line is dropped when tape is stopped indicating to CU 10 MTU 11 is available. Hence, normal ending status for MTU 11 after rewind or FS operation is the busy line 36 at a reference state and the interruption line 20 is in the reference state. The error termination for MTU 11 after rewind is the busy line 36 at a reference state, while the interrupt line is in the active state. Sensing of BOT/EOT and detection of completion of a rewind has been done for several years in various MTU's in accordance with USA standards, see references (1) and (2).

Rewind is an intermediate operational state existing in MTU 11 before BOT is sensed. When BOT is sensed, MTU 11 is ready for performing a data processing operation (read, write) or erasing the tape.

VERIFYING IBG CHECKING

In accordance with another aspect of the present invention, gating oscillator 120 pulses to interruption line 20 during a write operation for indicating an intermediate operating state during which an IBG is checked for recorded noise signals. In most digital tape drives, there are separate write and read gaps with writing occurring in only one direction of motion of media 100. It is customary for providing read-after-write checking; that is, when a block of data is being recorded, the data after being recorded on the tape is read back by the read gap. This action verifies that signals are actually recorded on the tape. Because of the physical spacing between the write and read gaps, there is a period of time before the read gap reaches the first recorded signal. During this period of time, the read gap is traversing an IBG; and normally, the readback bus (BI 32) is degated in CU 10. Based upon this, there is no way to detect noise in the IBG. In accordance with the present invention, a modulated signal from oscillator 120 is supplied over line 20 to CU 10 before the first signal is recorded by read/record circuits 106. Microprocessor 14 detects the oscillator 120 square waves to indicate the MTU is in the process of creating the proper interblock gap (IBG). When the MTU has moved the tape 100 to the position where the data flow circuits 13 should start to provide signals to be recorded, the MTU removes the modulated signal on line 20. The CU interprets the absence of modulation as an indication of a status change in the MTU. If line 20 remains in the inactive state, the CU interprets the change to indicate "gap complete." If line 20 remains in the active state, the CU interprets the change to indicate an MTU error and aborts the operation.

As soon as CU 10 supplies a WRITE command signal over BO 33 (timed with a CMD line active signal on line 18), control logic 112 establishes a write mode in MTU 11. This enables the recording circuits in read/record 106, as well as establishing write mode sensing in circuits 114. As soon as CU 10 supplies a MOVE signal over line 17, GO line 113 is activated; and motor 107 starts rotating capstan 103 moving tape 100.

To establish the square waves on line 20 before writing can be started (gap control is active, the first recorded signal), AND circuit 143 is jointly responsive to the write mode signal from control logic 112 on line 144, the not gap complete signal from control logic 112 on line 145, and the MOVE command signal on line 17 to activate CHK IBG line 50. CHK IBG line 50, when in the active condition, enables AND circuit 146 to pass oscillator 120 square waves to OR circuit 133.

When the first signal is to be recorded by read/record circuits 106, a gap control (GC) signal is supplied by control logic 112 in accordance with known techniques. This GC signal is then supplied over line 145 to AND circuit 143 thereby degating oscillator 120 pulses during the write operation. The move line 17 is always active.

In FIG. 2, signal 155 is found on line 36 and tells CU 10 that MTU 11 is moving tape 100 in response to the MOVE signal. Tachometer pulses 155 are supplied during an entire write operation. Signal 156 shows that the square waves from oscillator 120 are supplied over interruption line 20 until GC is provided at 157. After 157, interruption line 20 is in the reference state indicating no attention is needed by CU 10. Upon completion of the write operation, at 158, the tachometer pulses are no longer sensed; and CU 10 has dropped MOVE (usually upon detecting end of data). End of data detection is in accordance with established procedures.

Accordingly, in this aspect of the invention, oscillator 120 pulses indicate to CU 10 an intermediate operational state of MTU 11 indicating that the read gap is scanning an IBG and that signals being received over BI 32 are noise signals. CU 10 would be responsive to receipt of such noise signals to log noise in the IBG. This enables CPU, through it programming (not described), to backspace the tape and erase the IBG for eliminating the noise and then rewriting the record. So far, the continuous operational state signal indicating no change in MTU 11 has been used for two different purposes indicating two different intermediate operational states. Upon the change of an operational state, stopping the square wave signals, it is indicated to CU 10 other action has to be taken. Also note that activating interruption line 20 at 157 by MTU 11 signifies to CU 10 that an error condition is occurring and that corrective action is necessary. CU 10 responds by stopping the write operation and then diagnosing the operational state by issuing a SENSE command to MTU 11. Such SENSE commands are well known.

DISPLACEMENT MEASURING

A third application of the present invention is for displacement or position sensing of the tape with respect to head 104. In single capstan tape drives, as illustrated in FIG. 1, having rapid acceleration characteristics, various intermediate operations are required to effect tape transport for data processing operations. That is, alternate forward and backward tape motions provide accurate positioning. For example, when tape 100 moves from capstan 103 toward head 104 (backward), the frictional engagement of the tape with the head may cause wrinkling of the tape. Accordingly, in high-performance tape drives, capstan 103 is first rotated clockwise (forward) to move tape 100 over head 104 in an air-bearing manner. Capstan 103 rotation reverses for moving tape backwardly over head 104. In other positioning schemes (sometimes called "hitching"), forward and backward motions are used to position tape such that, upon a start movement, appropriate velocity is reached before any signals are to be recorded or sensed. Accordingly, in many instances upon receiving a MOVE command from CU 10, MTU 11 responds by momentarily moving tape in an opposite direction before moving tape in the commanded direction. In a read backward, for example, the initial clockwise rotation of capstan 103 and subsequent counterclockwise rotation, is called a forward hitch.

Tachometer signals on line 36 do not contain directional information. Accordingly, if CU 10 were counting such tachometer pulses for metering tape displacement, it must know the direction of motion. According to the present invention, this is provided by supplying square waves over line 20 whenever MTU 11 is moving tape 100 in a direction opposite to the commanded direction, i.e., during an intermediate operation preceding a commanded data processing operation. Upon completing such a hitch operation and moving the tape in the commanded direction, the square waves are stopped. CU 10 senses the combination of the tachometer signal and whether or not interruption line 20 has square waves for calculating positive and negative displacements with respect to the commanded move direction.

In MTU 11, tachometer 109 may be a two-phase tachometer supplying two-phase signals to direction detector 160. The direction detector shown in FIG. 5 of the Beach and Hardy U.S. Pat. No. 3,584,284 may be used. The actual direction of motion is indicated by the signal state on line 161 and is compared with the commanded direction of motion by a pair of AND circuits 162 and 163. The commanded direction is indicated to control logic 112 over BO 33 and then recorded in CMD DIR (commanded direction) latch 165. Signal state B indicates a BACKWARD commanded move, and signal state F indicates a FORWARD commanded move. AND circuit 162 is jointly responsive to the BACKWARD command and to line 161 indicating a forward direction of motion to supply an enabling signal to AND circuit 167 for passing oscillator 120 square waves to interruption line 120. In a similar manner, AND circuit 163 is responsive to the inverted line 161 signal to supply an enabling signal to AND circuit 167. Accordingly, irrespective of the direction of the commanded MOVE, whenever the sensed direction of motion is opposite to the commanded direction, oscillator pulses appear on line 20. The MOVE signal on line 17, used as a third input to AND circuits 162 and 163, is for giving CU 10 control of the square waves.

In FIG. 2, line 36 signal 170 shows tachometer pulses being supplied to CU 10. CU 10 is microprogrammed in processor 14 to memorize the commanded direction in a similar manner to that memorized in MTU 11. Upon receipt of tachometer pulses 170 and hitch (opposite move direction) indicating square wave 171, CU 10 knows the direction of motion is opposite to that commanded. It then subtracts the distance represented by tachometer pulses 170 from a reference value. Upon cessation of square waves 171, CU 10 knows MTU 11 is now transporting tape 100 in the commanded direction, as at 172. It then adds the distance represented by tachometer pulses 170. For purposes of illustration, a second hitch is performed at 173 just prior to stopping the tape 100 at 174. Whenever the tape 100 is being moved opposite to the commanded direction, interruption line 20 can carry an interruption signal by going to a steady-state active condition.

If an interruption signal is initiated during a hitching operation, i.e., during occurrence of square waves 171, a cessation of the square waves occurs. As will become apparent, CU 10 can be programmed to detect this change. Upon detection of an interruption state, square waves 171 are stopped, tape stopped, and interruption line activated by MTU 11 control logic.

MICROPROGRAM SQUARE WAVE DETECTION

Figure 3:
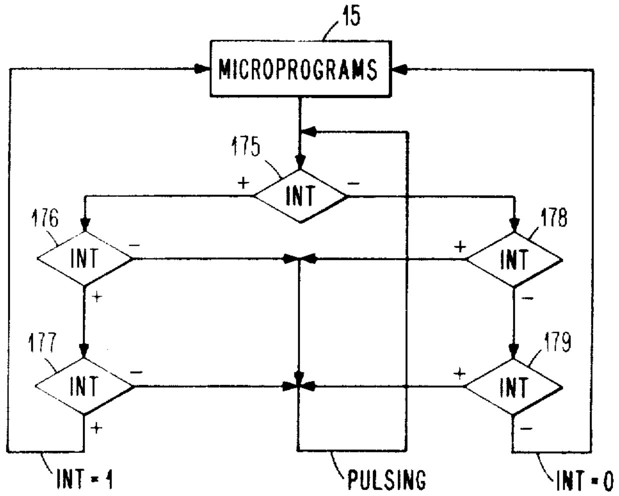
FIG. 3 is a simplified microprogram flow-chart showing a pulse detecting sequence for detecting the modulated signal supplied by the connected I/O device.

Microprogram detection of square waves 128, 156, or 171 is explained with respect to FIG. 3. A small subroutine represented by steps 175–179 is sued for sensing interruption condition as done on a periodic basis in microprograms 15. Each step 175–179 is timed by CU 10 to be slightly different than the duration of one-half of a cycle of square waves from oscillator 120. This is done such that any three successive cycles will correspond to two different signal states in the square waves. To ensure accurate detection, at least three successive machine cycles or steps are used to detect the pulsing condition.

The first step 175 causes CU 10 to sense the signal state of line 20. If it is positive, steps 176 and 177 are performed; and if negative, steps 178 and 179 are performed. (A positive condition is defined to mean an interruption state.) Upon detection of the interruption state, which may be either an actual interruption condition or a positive portion of the pulsing condition, step 176 detects for a positive or negative. If it is negative, a pulsing condition is indicated telling CU 10 no further action need be taken until a change of state. Accordingly, the microprogram re-enters step 175 and continues looping as will become apparent until a steady-state condition is provide don line 20. However, it may be that step 176 will detect a positive signal. Then, step 177, if the line is pulsing, it will certainly detect a change in state. If step 177 also indicates a positive state, an interruption condition is indicated; and the loop exits directly to microprograms 15 for interruption signal processing in accordance with known techniques.

In a similar manner, a negative interruption state indicates a normal ending condition. Step 178 detects a change from the normal indicating state. If there is a change, step 175 is again performed. Note that this change may be from pulsing or from a change due to a normal state to an error-indicating state. In the latter, steps 175, 176, and 177 will detect the error-indicating state. Step 179 cooperates with steps 175 and 178 as explained for the positive state. Each step 175–179 is a branch-on-condition instruction. The steps are combined using known microprogramming techniques, see Husson, supra.

INTERRUPT SIGNAL GATING OF INTERMEDIATE OPERATIONAL STATUS SIGNALS

Under certain circumstances, it may be desirable that interruption signals supplied by control logic 112 over line 181, thence to line 20, take priority over intermediate operational status signals. To this end, OR circuit 133 is a diode OR circuit. The active interruption signal is a first signal amplitude equal to the signal amplitude of the pulsating signal from oscillator 120. As is well known by selecting the polarity of the amplitude with respect to the diode poling, supplying the active interruption signal blocks all the reference potential by reverse biasing the diodes receiving such reference potential, hence, blocks the pulsating signal. The other signal amplitude is a reference potential.

With the above-described circuitry, the intermediate operating state signal from OR circuit 133 is continuously supplied during such intermediate operating state over line 20 unless an interruption condition is established by control logic 112. CU responds to such interruption signal; and, upon completion of obtaining sense data about the interrupt (in a known manner), the interruption condition is removed by control logic 112. If the intermediate operational state has not been completed by that time, OR circuit 133 again passes the continuous signal. Accordingly, during an intermediate operational state, an interruption can be handled without necessarily aborting the intermediate operation. Such a situation is useful during initial status which includes setting latch 51, a free-standing operation which includes setting latch 131, and the like.

In response to the interruption signal overriding the intermediate operating state signal, CU may order the peripheral device to change status by activating the CMD line 18 and sending a MODE SET signal over BO 33. In this case, the intermediate state could be erased in response to the interruption signal.

While the invention has been particularly shown and described with reference to preferred embodiments thereof, it will be understood by those skilled in the art that various changes in form and details may be made therein without departing from the spirit and scope of the invention.

What is claimed is:

1. A magnetic tape transport drive adapted to be connected to a controller for effecting signal processing operations relating to recording on and reading from a magnetic media and having input lines for respectively receiving a MOVE command signal instructing relative movement between a transducer and the media, a command line for causing it to receive signals commanding a function to be performed, said tape unit having an output terminal indicating interruption condition and a second output terminal for indicating busy and not busy conditions, a set of bus-in lines for carrying data signals and status signals from the tape drive to a connected controlling unit, and a like set of incoming bus-out lines for receiving said command signals plus data signals to be recorded,
   a timing signal generator,
   the improvement including in combination:
   bistable means indicating an extended operation to be performed by the drive independent of a connected controller,
   AND circuit means jointly responsive to the generator and to said bistable means to continuously supply timing signals to said interruption line during said extended operation,
   means supplying an interruption signal to said line upon the detection of an interruption condition, and
   means operative at the end of said extended operation to reset said bistable means.

2. The drive set forth in claim 1 including control means responsive to signals on said bus-out lines to establish a write mode in said drive,
   indicating means jointly responsive to said write mode and a just-received MOVE command initially to establish a check IBG condition in said drive,
   AND circuit means jointly responsive to said generator and said check IBG condition to supply timing signals over said interruption line, and
   control means indicating end of an IBG during said write mode and operative to reset said check IBG condition for removing the timing signals from said interruption line.

3. The drive set forth in claim 1 further including direction indicating means indicating the relative direction of motion between magnetic media and a transducer,
   means memorizing a commanded direction of movement, comparison means jointly responsive to said direction indication and said commanded direction to indicate whether or not the media is relatively moving in the direction commanded and supplying same to said interruption line, and tachometer means indicating the rate of said relative movement and means connecting said tachometer means to said busy line for supplying tachometer signals thereover simultaneously with said opposite move indication.

4. The drive set forth in claim 3 wherein said means coupling said tachometer means to said busy line include AND circuit means jointly responsive to said tachometer signals and to said MOVE signal for supplying said tachometer signals over said busy line irrespective of said opposite move indication.

5. The drive set forth in claim 3 wherein said comparison means includes gating means receiving said timing signals and passing same to said interruption line whenever said media is relatively moving opposite to said commanded direction.

6. A peripheral device adapted to be connected to a controlling unit for performing data processing operations in connection with a data processing system and including predetermined mechanical movements having selected coordinated electrical functions performed therewith and capable of supplying interruption signals and busy/not busy signals over lines to such controlling unit, the improvement including in combination:

motion means responsive to commands received from a connected controlling unit to effect mechanical movements in said peripheral device, indicating means responsive to said mechanical movements being commanded to continuously supply timed signals over one of said lines during said mechanical movements, control means responsive to said electrical functions to terminate said timed signals for indicating completion of a given one of said mechanical movements, and said control means being responsive to an operational condition of said peripheral device for indicating the interruption and busy states over said lines respectively independently of said timed signals.

7. The device set forth in claim 6 further including commanded direction of movements and direction detection means, and means indicating movements opposite to said commanded direction, and said indicating means being responsive to said opposite move indication to supply an additional indicating signal over one of said lines, and means supplying signals indicative of the amount of movement over another of said lines simultaneously to said opposite move indications.

8. The device set forth in claim 6 further capable of effecting selective mechanical movements without a given associated electrical function, said indicating means being further responsive to said movements without said given electrical function to supply timed signals over one of said lines and terminating said timed signals upon initiation of said given electrical function even though said mechanical movements may continue.

9. The device set forth in claim 8 comprising a magnetic tape unit (MTU) having a transducer for exchanging signals with a magnetic tape transported within said MTU and having recording and readback gaps in a predetermined spaced-apart relationship such that a recorded signal can be sensed in said read gap after a predetermined relative movement between said transducer and a record media, the improvement further including in combination:

said given electrical function sensing signals from said medium and transferring same as readback signals, means in said MTU indicating not gap control (not ready to write) wherein said transducer writing gap is scanning an IBG (interblock gap — a nonrecorded medium) area, means jointly responsive to a WRITE command, said not gap control, and a move indication to supply said intermediate operational state indicating signal, and means for removing said not gap control signal.

10. The device set forth in claim 6 further including an initial status memory means, AND circuit means jointly responsive to said memory means being in the active condition and to said indicating means to pass said timed signals to one of said lines, said control means being further responsive to a sensed ending of an initial status to reset said memory means from the active condition, further means in said control means responsive to an error condition to reset said memory means from the active condition, and means in said control means to establish an initializing condition and setting said memory means to the active condition and including supplying a not busy signal to a controlling unit simultaneously with said timed signals.

11. A peripheral device adapted to be connected to digital signal processing apparatus for performing signal processing operations, the device capable of effecting predetermined mechanical movements and selective corresponding electrical functions, means for indicating operational states relating to said movements and said functions, first and second output control lines, the improvement including in combination:

first signal producing means supplying a first output signal over said first output control line indicating a first status in said device, second signal producing means supplying a second output signal over said second output control line indicating a second status in said device, intermediate means indicating an intermediate operational state in said device, means responsive to said intermediate indication to continuously supply during such intermediate operational indication a third signal in place of one of said output signals over a corresponding one of said output control lines, and said third signal having distinguishable characteristics from said one output signal.

12. The peripheral device of claim 11 further including an input MOVE line for receiving signals commanding said predetermined mechanical movements, and gating means receiving said third signal and supplying same only when said one output signal is not in a given active state for indicating a first state of said one status such that said third signal is selectively interruptable in accordance with said first state.

13. The peripheral device of claim 12 wherein said intermediate means includes logic means jointly responsive to operational state indicators for indicating first intermediate operational states, latch means in said intermediate means being settable upon initiation of an intermediate operational state and continuously indicating such state until said predetermined mechanical movement has reached a predetermined position.

14. The peripheral device set forth in claim 12 further including directional tachometer means operatively associated with said mechanical movements for detecting the amount and direction of movement and indicating such direction, commanded direction memory means indicating a commanded direction of relative movement, comparison means jointly responsive to said commanded direction memory means and said tachometer means to indicate a relative movement opposite to the commanded direction, and said intermediate means responsive to said opposite move indication to indicate an intermediate operational state only during said opposite move indication.

15. The peripheral device of claim 14 wherein said comparison means is actuated by a MOVE signal on said input MOVE line to effect said joint responsiveness, said intermediate means receiving said opposite move indication and including further logic means not gated by said MOVE signal and additional logic means gated by said MOVE signal in addition to said opposite move indication.

16. The peripheral device of claim 15 wherein said intermediate means includes first and second logic means, a MOVE input terminal in said device for receiving a command for a predetermined mechanical movement, said first logic means being jointly responsive to said MOVE command and to said intermediate operational indication to supply a first intermediate operational indication and second means for selectively generating another intermediate operational state indication independent of said MOVE command, and means for combining said intermediate operational indications.

17. The device set forth in claim 11 further including an initial status latch in said intermediate means indicating a status preparatory to signal processing operations, said intermediate means indicating the intermediate operational state when said latch is set to the active condition;

control means resetting said latch upon detection of an error condition in said device or upon completion of said initial status.

18. The device set forth in claim 11 further including gating means receiving said third signal and responsive to one of said output signals being in an active signal state to block said third signal, control means actuating same to enable supplying said third signal at all times during said intermediate indication subject to priority of said one output signal whereby attention of a controlling unit is enabled without aborting said intermediate operational state.

19. A peripheral subsystem for a data processing system including a peripheral device capable of effecting predetermined mechanical movements selectively with corresponding electrical functions, means in the device for indicating operational states thereof with respect to said movements and functions, a controlling portion in said peripheral subsystem including a microprocessor and data flow circuit means;

control means in said peripheral device for receiving and being responsive to MOVE and command signals from said controlling unit, a set of bus lines extending from the controlling unit to the device for transferring data signals thereacross and exchanging command signals whenever said command line is activated by the controlling unit;

a pair of lines extending from the device to the controlling unit respectively for interruption and busy status transfer, said control logic means supplying said status signals to said lines;

the improvement including in combination:

intermediate operational state means in said device for indicating the existence of an intermediate operational state associated with said movements, oscillator means supplying timed signals, gating means jointly responsive to said intermediate operational state means and said oscillator means for supplying pulses to one of said lines extending from the device to the controlling unit, and said control means supplying steady-state signals over said lines for indicating status such that the pulses are superimposed on the steady-state signals for indicating the intermediate operational state.

20. The peripheral subsystem set forth in claim 19 wherein said device is a magnetic tape transport capable of transporting magnetic media in relative motion with respect to a transducer and said device further including read/record circuits responsive to said control means for effecting transducing operations with respect to said magnetic media, said data flow circuits in said controlling unit constituting signal-state changing circuits for changing format of signals between a data processing code and a storage code, the improvement further including:

initial status means in said intermediate operational state means for indicating that a magnetic media is being loaded onto said tape transport and said initial status means being resettable by said interruption signal or a not ready to ready signal generated by said control logic, and said control logic sending a not busy state to said controlling unit to avoid committing said device to said controlling unit during said media loading.

21. The method of operating a peripheral device having predetermined mechanical motions with corresponding electrical functions being performed on a selective basis, means for detecting an error condition, control means for controlling the device including control of said motions and functions, the improvement including the following steps in combination:

performing an intermediate operation including one of said predetermined mechanical functions, continuously indicating said intermediate operation, interrupting such continuous indication upon detection of an error condition while selectively continuing said intermediate operation.

22. An interfacing system for a peripheral unit and a control unit, including first and second tag lines extending between said units for transferring status signals from the peripheral unit to said control unit, said peripheral unit having first operational states requiring no action by said control unit, second operational states requiring action by said control unit, and an intermediate operational state requiring no action by the control unit at least until cessation of such intermediate operational state, a pair of signal lines extending between said units for carrying control signals from said control unit to said peripheral unit, the improvement including in combination:

first means in said peripheral unit for establishing first signal conditions on said tag lines, modulation means in said peripheral unit for modulating one of said first signal conditions on said tag lines for indicating said intermediate operational state, means intermediate said first and modulation means and said tag lines and responsive to one of said second operational states to supply a second signal condition in place of said one first signal condition and including means blocking said modulating signal condition in response to said second signal condition, means in said peripheral unit continuing said first or second operational state indicating signal conditions as said modulating signal condition is removed from said lines, and means in said control unit responsive to said signal conditions for indicating which operational state is present in said peripheral unit.

23. The method of indicating relative motion of a movable member with respect to another member in a peripheral device connected to a control unit, error detecting means in the peripheral device, including the following steps in combination:

in the peripheral device, memorizing a commanded direction of motion received from said control unit, detecting the relative direction of motion, comparing said two directions and continuously indicating the relative direction of motion when opposite to the commanded direction, supplying the continuous indications to said control unit, and interrupting said continuous indication upon detecting an error in said peripheral device.

24. The method set forth in claim 23 wherein said continuous indication is a set of constant frequency square waves supplied through an OR circuit to said control unit, interrupting said continuous indication by supplying a constant-amplitude signal error through said OR circuit to said control unit such that the amplitude of the constant-amplitude signal is equal to the maximum amplitude of the pulsating signal such that the pulsating signal is erased, and causing the control unit to respond to the error indicating signal for stopping relative movement.

* * * * *